United States Patent [19]
Maeda

[11] Patent Number: 5,518,631
[45] Date of Patent: May 21, 1996

[54] DEPHOSPHORIZING MATERIAL AND METHOD OF DEPHOSPHORIZATION

[75] Inventor: Terunobu Maeda, Inamachi, Japan

[73] Assignee: Hazama Corporation, Tokyo, Japan

[21] Appl. No.: 244,946

[22] PCT Filed: Oct. 28, 1993

[86] PCT No.: PCT/JP93/01559

§ 371 Date: Jun. 10, 1994

§ 102(e) Date: Jun. 10, 1994

[87] PCT Pub. No.: WO94/10092

PCT Pub. Date: May 11, 1994

[30] Foreign Application Priority Data

Oct. 28, 1992 [JP] Japan .................. 4-290385

[51] Int. Cl.⁶ ........................................ C02F 1/52
[52] U.S. Cl. .................. 210/702; 210/906; 252/175; 423/157.5; 423/158; 423/140; 423/311
[58] Field of Search ............... 210/906, 907, 210/702; 252/175; 423/157.5, 158, 140, 311; 422/164, 239, 240, 218

[56] References Cited

U.S. PATENT DOCUMENTS 3,499,837  3/1970  Jaunarajs .................. 210/906
5,008,224  4/1991  Watanabe et al. .................. 210/906

FOREIGN PATENT DOCUMENTS 4227     1/1982  Japan .................. 210/906
242190   9/1989  Japan .................. 210/906
8495     1/1991  Japan .................. 210/906
16288    1/1992  Japan .................. 210/906

Primary Examiner—Neil McCarthy
Attorney, Agent, or Firm—Darby & Darby

[57] ABSTRACT

A dephosphorizing material disposed so that a material containing iron as a main component and a calcium compound material contact a phosphorus-containing aqueous solution, and provided with a water-permeable material at least around the material containing iron as a main component. A phosphorus component of sewage and river water can be removed easily by simply bringing this dephosphorizing material into contact with such phosphorus-containing aqueous solutions, without employing any special solution control method. This dephosphorizing material is capable of reducing the outflow of iron rust occurring due to the oxidation of iron during a dephosphorization of a phosphorus-containing aqueous solution, and the iron effluent can be eliminated by the action of the calcium compound material. Accordingly, this dephosphorizing material can be applied practically to sewage and river water.

10 Claims, 1 Drawing Sheet

DEPHOSPHORIZING MATERIAL AND METHOD OF DEPHOSPHORIZATION

FIELD OF ART

The present invention relates to a dephosphorizing material for effectively removing phosphorus component in sewages, rivers and the like, and to an easy and convenient method of dephosphorization using such dephosphorizing material.

BACKGROUND ART

Various discussions have hitherto been made as to a dephosphorizing process in sewages, rivers and the like, and pilot experiments have been made in various parts of the country. For example, a method of contact dephosphorization is known, wherein water containing phosphorus is controlled under appropriate conditions to bring into contact with a compound of same species and same system consisting of calcium phosphate, and calcium phosphate (hydroxy apatite) is formed and crystallized on the compound.

In the contact dephosphorization method, the concentration of the phosphorus component in water can be lowered effectively. However, since the phosphorus-containing water requires pH adjustment by a decarboxylating process or addition of lime in order to control such crystallizing reaction, and such control should be made all the time, this method has a drawback to complicate the process. Therefore, the development is desired of a method for effectively removing phosphorus which is economically superior as well as easy and convenient, and of dephosphorizing material which can be used in such a method.

DISCLOSURE OF THE INVENTION

It is an object of the present invention to provide a novel dephosphorizing material which can remove a phosphorus component effectively in sewages, rivers and the like as well as decrease the amount of iron rust.

It is another object of the present invention to provide a dephosphorizing method wherein a phosphorus component can be readily removed in sewages, rivers and the like without special control or the like.

In accordance with the present invention, there is provided a dephosphorizing :material characterized in that a material containing iron as a main component and a calcium compound material are arranged to contact a phosphorus-containing aqueous solution, and in that a water permeable material is provided at least around said material containing iron as a main component.

In accordance with the present invention, there is also provided a method of dephosphorization characterized in that the aforementioned dephosphorizing material is brought into contact with the phosphorus-containing aqueous solution.

THE BEST MODE FOR CARRYING OUT THE INVENTION

Figure 1:
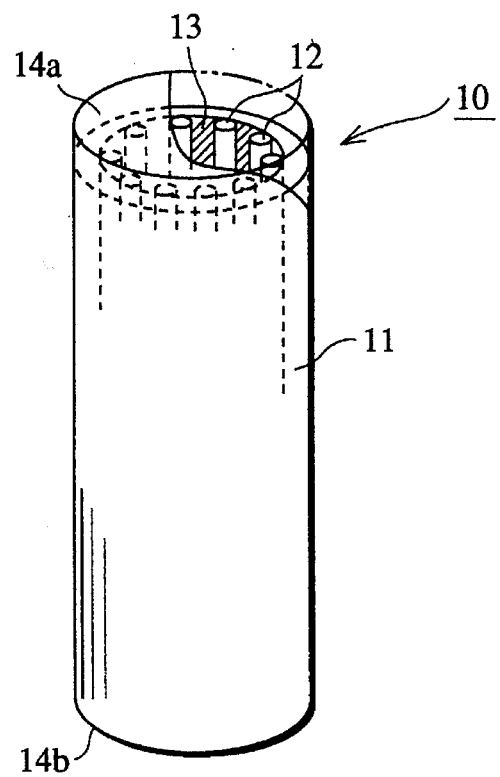
FIG. 1 is a partial perspective view depicting a dephosphorizing material produced in Example 1.

The present invention is explained further in detail hereinbelow.

In the present dephosphorizing material, a material containing iron as a main component and a calcium compound material are arranged to contact a phosphorus-containing solution, and a water permeable material is provided at least around the above-mentioned material containing iron as a main component. By bringing such dephosphorizing material into contact with a phosphorus-containing aqueous solution, the phosphorus-containing solution reacts with the material containing iron as a main component and the calcium compound material to fix the phosphorus component on the surface of the water permeable material and the like as $Fe(PO_4)_2 \cdot 8H_2O$ (vivianite) and/or $Ca_5(PO_4)_3OH$ (hydroxy apatite). At this time, the water permeable material in the dephosphorizing material acts to decrease the outflow of the iron rust and remove the iron eluate with the calcium compound material by providing the water permeable material at least around the material containing iron as a main component.

The material containing iron as a main component may include, for example, iron powers, iron reinforcing bars, iron plates, iron fibers, $Fe_2O_3$, $Fe_3O_4$, and the like.

The calcium compound material may include calcium hydroxide, calcium carbonate, limestone (calcite), coral (argonite), calcium chloride, calcium sulfate, calcium sulfate hydrate, and the like, or cement materials such as Portland cement and the like may be used.

In the present dephosphorizing material, the mixing ratio of the material containing iron as a main component and the calcium compound material is such that the iron component in the material containing iron as a main component:calcium compound material is preferably 0.1 to 50:1 to 100, more preferably 10 to 50:1 to 100 by weight ratio.

If the ratio of the iron is less than 0.1, and/or the ratio of the calcium compound material is less than 1, the dephosphorizable time period becomes shorter, whereas if the ratio of the iron is more than 50, and/or the ratio of the calcium compound material is more than 100, the further enhancement in effect is not expected, thus being uneconomical and not preferred.

In the present dephosphorizing material, the water permeable material is not particularly limited as long as this material has such coefficient of water permeability that, on bringing the dephosphorizing material into contact with phosphorus-containing solution, the phosphorus-containing solution soaks through the material to contact the material containing iron as a main component. However, the coefficient of water permeability is preferably $10^{-8}$ to $10^{-2}$ cm·sec$^{-1}$, more preferably $10^{-6}$ to $10^{-3}$ cm·sec$^{-1}$. If the coefficient of water permeability is less than $10^{-8}$ cm·sec$^1$, the dephosphorizing reaction does not progress effectively, whereas the coefficient of water permeability is more than $10^{-2}$ cm·sec$^{-1}$, the iron rusting in the material containing iron as a main component takes precedence over the dephosphorizing reaction, thus being not preferred.

Specific materials for use as the water permeable material may include, for example, a cementitious substance such as concrete or mortar including ordinary Portland cements; biscuit earthenwares, ceramics, sintered metals, high polymer foaming bodies, solidified wood powder bodies, nonwoven fabrics, woven fabrics, plastic materials, and the like. These materials may be prepared to have such coefficient of water permeability that the phosphorus-containing aqueous solution soaks through the materials to contact at least the material containing iron as a main component. Alternatively, a publicly known filter material consisting of these materials, for example, "Wind Cartridge Filter TCW-0.5N-PP" (manufactured by Toyo Roshi Kabushiki Kaisha, nominal pore diameter 0.5 μm, outer diameter 70 mmø, inner diameter 27 mmø, length 750 mmø, made of polypropylene) or the like may be used. In this case, if the coefficient of water permeability is more than desired, the coefficient of water permeability may be adjusted by using a suspension of, for example red iron oxide. Further, in order to bring particularly the coefficient of water permeability of the cementitious substance into the above-mentioned desired range, the coefficient may be adjusted to the desired value through, for example, a method of adjusting a water cement ratio to 100 to 200%, or a method of making the cementitious substance porous by adding calcium sulfoalminate additive thereto and soaking the admixture in an acidic solution such as carbonate or diluted hydrochloric acid after the placing of concrete. In this way, when the calcium compound material is used as a water permeable material, the above-mentioned calcium compound material does not have to be arranged separately.

The shape of the water permeable material is not particularly limited as long as it is hollow shaped for covering at least the material containing iron as a main component, and may include a bag, a cylinder, a hollow prism or the like. In the case of using a material which is difficult to retain its shape such as woven fabric or non woven fabric as the water permeable material, the water permeable material may be covered with a net such as drainage tube for the purpose of shape retention. Additionally, the thickness of the water permeable material is not particularly limited, but is preferably 0.1 to 100 mm, more preferably 0.2 to 30 mm. If the thickness is more than 100 mm, the reactivity of the material containing iron as a main component and the phosphorus-containing aqueous solution decreases and the desired dephosphorizing effect may not occur, thus being not preferred.

The present dephosphorizing material may be prepared by providing the water permeable material at least around the material containing iron as a main component, and arranging the calcium compound material in the hollow and/or outside of the water permeable material; or by forming the water permeable material with the calcium compound material itself, and arranging the material containing iron as a main component in the hollow of the water permeable material. Specifically, a water permeable material including inside thereof the material containing iron as a main component may be produced by, for example, arranging or charging material containing iron as a main component into a hollow water permeable material. In this case, the calcium compound material, water retaining materials such as sawdust, an alkali agent such as sodium hydroxide, or halides for accelerating oxydization of iron such as sodium chloride, potassium chloride, iron chloride, sodium bromide, or potassium bromide may be included in the hollow of the water permeable material in addition to the material containing iron as a main component. As the water permeable material including the material containing iron as a main component, a used easy body warmer, for example, of the trade name "Nukukko" (manufactured by Kabushiki Kaisha Nittetsu Fine Product), or the like may be used as it is.

On the other hand, when the calcium compound material is arranged outside the water permeable material, a plurality of water permeable materials including the material containing iron as a main component and a plurality of calcium compound materials may be fixed or charged in a vessel, for example of a pipe shape, which may be disposed in water channels of the phosphorous-containing aqueous solution, the vessel having an opening through which the phosphorus-containing aqueous solution flows in and out, so that the phosphorus-containing aqueous solution flows therethrough.

The present method of dephosphorization may be carried out by soaking the dephosphorizing material in a phosphorus-containing aqueous solution in sewages, rivers, sewage treatment plant aeration tanks, flow-out channels, or the like, or if the calcium compound material is arranged outside the water permeable material, by arranging a plurality of water permeable materials including material containing iron as a main component and a plurality of calcium compound materials in a water channel of the phosphorus-containing aqueous solution by fixing, charging, or the like method, so that the phosphorus-containing aqueous solution may flow through the materials, thereby simply bringing a dephosphorizing material into contact with a phosphorus-containing aqueous solution.

When the phosphorus-containing solution is brought into contact with the dephosphorizing material, the phosphorus component is fixed, for example onto the surface of the water permeable material of the dephosphorizing material as mentioned above. The fixed phosphorus component may be removed with sludge or the like after, for example scraping the fixed phosphorus component manually or automatically off the dephosphorizing material. The dephosphorizing material after the removal of the reactants may be used again by soaking as it is if the water permeable material retains the before-mentioned water permeability. That is, according to the present method, phosphorus is fixed, for example onto the surface of the water permeable material by soaking the dephosphorizing material, preferably a plurality of the dephosphorizing materials, in the phosphorus-containing aqueous solution, and the dephosphorizing material may be reused by removing the fixed phosphorus.

The interval for removing phosphorus from the dephosphorizing material may suitably be selected depending on the concentration of phosphorus in the water, amount of the dephosphorizing material, and the like.

The dephosphorizing material of the present invention has the water permeable material and includes the material containing iron as a main component and the calcium compound material, and may effectively be used for dephosphorization in sewages, rivers, or the like. Further, the method of dephosphorization of the present invention is quite easy and convenient since the method may be carried out simply by soaking or fixing a particular dephosphorizing material in a water channel of the phosphorus-containing aqueous solution, and the phosphorus component is effectively removed without a need of a special control.

EXAMPLES

The present invention will now be illustrated in more detail by way of Examples and Comparative Examples. However, the present invention is not limited thereto.

Example 1

In order to produce a dephosphorizing material 10 as shown in FIG. 1, ten iron reinforcing bars of 10 mmø were arranged with equal intervals along the inner wall of a biscuit clay tube (coefficient of water permeability $10^{-4}$ cm·sec$^{-1}$) having outer diameter of 24.6 cm, inner diameter of 20 cm, and height of 90 cm, and calcium hydroxide 13 was charged therein. Then the upper and lower ends of the biscuit clay tube were covered with nonshrink mortar of 5 cm thick. The mixing ratio by weight of iron and the calcium compound was 1:16.

Figure 2:
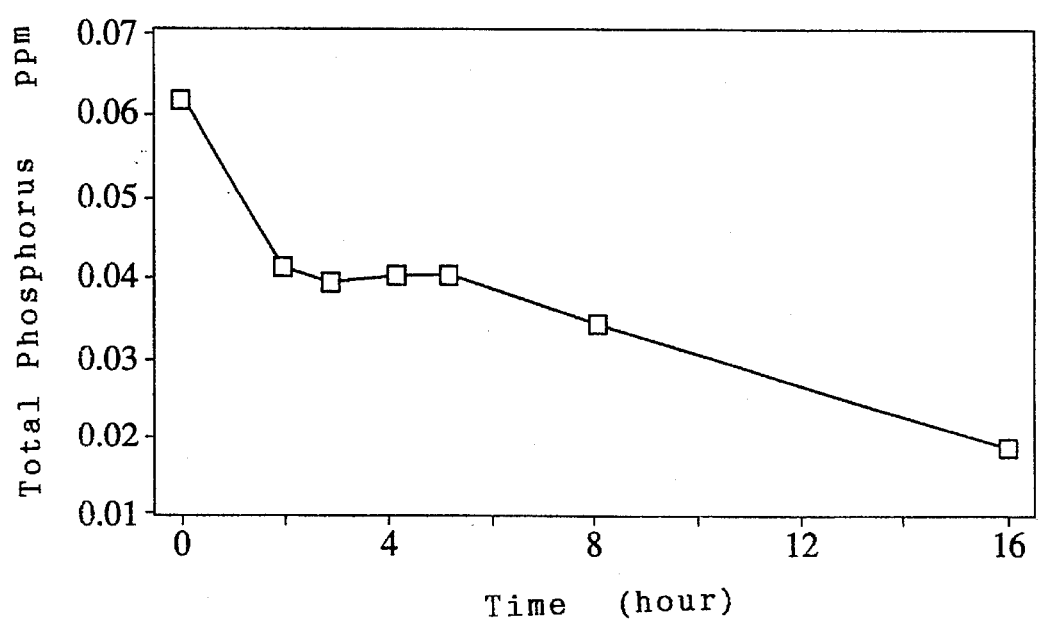
FIG. 2 is a graph showing chronological change of the phosphorus concentration by a phosphorus-molybdenum oxidization method for measuring the dephosphorizing effect of the dephosphorizing material produced in Example 1.

Next, in order to measure the dephosphorizing effect of the thus produced dephosphorizing material 10, the dephosphorizing material 10 was accomodated in a vinyl chloride pipe having inner diameter of 300 mmø and length of 1 m, the vinyl chloride pipe was filled with $KH_2PO_4$ aqueous solution having the concentration of 0.062 ppm, and the chronological change of the phosphorus concentration in the $KH_2PO_4$ aqueous solution was measured by the phosphorus-molybdenum oxidization method. The result is shown in FIG. 2.

Example 2

A suspension of red iron oxide for pigment use was passed through "Wind Cartridge Filter TCW-0.5N-PP (trade name)" (manufactured by Toyo Roshi Kabushiki Kaisha, nominal pore diameter of 0.5 μm, outer diameter of 70 mmø, inner diameter of 27 mmø, and length of 750 mmø, made of polypropylene) to adjust the coefficient of water permeability to $10^{-5}$ cm·sec$^{-1}$, and a hollow columnar water permeable material was prepared. Then three iron reinforcing bars of 10 mmø which were threaded at both ends were arranged with equal intervals along the inner circumferential periphery of the water permeable material, and calcium hydroxide was charged into the inner cavity thereof before the both ends of the water permeable material were shielded by round stainless covers to produce the dephosphorizing material. The mixing ratio by weight of iron and calcium compound was 2:5.

Then the thus produced dephosphorizing material was put in a vessel having inner diameter of 100 mmø and length of 1 m, and the aqueous solution of 0.062 ppm was charged to measure the phosphorus concentration in the $KH_2PO_4$ aqueous solution by the phosphorus-molybdenum oxidization method. After two hours, the phosphorus concentration was measured to be 0.013 ppm, so that the dephosphorization was proved to be carried out effectively.

Example 3

A mixed material of 100 parts by weight of iron nails (approximately 1.5 mmø, 40 mm long), 100 parts by weight of cement, 500 parts by weight of water, 10 parts by weight of vinsol (manufactured by Kabushiki Kaisha Yamamune), and 30 parts by weight of bentonite was charged and solidified in a hollow columnar water permeable material as prepared in the same manner as described in Example 2. After 28 days of curing in water, the phosphorus concentration was measured in the same manner as described in Example 2 whereupon the phosphorus concentration after 2 hours was 0.026 ppm.

Example 4

A covered material for dephosphorization was produced by arranging iron reinforcing bars having diameter of 13 mm in logitudinal and transverse 5 cm pitches, covering the bars with concrete of which coefficient of water permeability was adjusted to be $10^{-4}$ cm·sec$^{1}$ so that the concrete covering depth of the upper bar is 1 cm, and drying the same. The mixing ratio by weight of iron and calcium compound was 33:10. The thus obtained covered material was soaked for one year in a sewage treatment plant aeration tank with approximately 2.0 ppm of phosphorus concentration, whereupon vivianite and hydroxy apatite stuck 1 g/year·cm$^2$ in average along the surface bars of the covered material. The phosphorus concentration in the aeration tank after the dephosphorizing treatment was 0.1 ppm, and the coefficient of water permeability of the cover measured after the dephosphorizing treatment was $10^{-4}$ cm·sec$^{-1}$.

Example 5

Dephosphorizing treatment was carried out in the same manner as described in Example 4 except that the concrete covering depth of the upper bars had 4 cm, whereupon vivianite and hydroxy apatite stuck 0.05 g/year·cm$^2$ in average along the surface bars of the cover.

Example 6

Tubes of 50 mmø×4 m were formed with polyester filter cloth having average mesh size of 75 μm (manufactured by Shikishima Canvas Kabushiki Kaisha, trade name "T-606"), each content as shown in Table 1 was separately charged therein, and both ends of the tubes were blocked. The coefficient of water permeability of the tubes was $10^{-2}$cm·sec$^{-1}$. Then the obtained tubes were inserted into high density polyethylene drainage tubes with inner diameter of 52 mm (manufactured by Taiyo Kogyo Kabushiki Kaisha, trade name "McDrain") for shaping, eight of which were in turn inserted serially into a VP75 vinylchloride pipe for water. A solution with phosphorus concentration of 0.200 ppm ($PO_4^-$) was passed at Sv value of 0.5 through each tube of different contents, and the phosphorus concentration of the processed solution at the pipe outlet was measured. The results are shown in Table 1.

TABLE 1

| No. | Composition (weight ratio) | Phosphorus Concentration of Processed Solution |
|---|---|---|
| 1 | iron powders/calcium carbonate powders (1/1) | 0.018 ppm |
| 2 | iron powders/gypsum dihydroxide (1/1) | 0.013 ppm |
| 3 | content of body warmer/coral sand (1/1) | 0.021 ppm |
| 4 | dust/coral sand (1/1) | 0.012 ppm |
| 5 | iron powders/coral sand (1/1) | 0.022 ppm |

Content of body warmer: content of a disposable body warmer (manufactured by Kabushiki Kaisha Nittetsu Fine Product, trade name "Nukukko") after use
Dust: Dust from electric dust collectors in iron manufacturer (iron component 67 weight %)

Example 7

Disposable body warmers after use (manufactured by Kabushiki Kaisha Nittetsu Fine Product, trade name "Nukukko") (component composition before use: iron 50 weight %, diatomaceous earth 11 weight %, activated carbon 1 weigh %, table salt 4%, sodium hydroxide 0.5 weight %, and the balance of water) and fossil coaral (aragonite) with particulate size of 20 to 40 mm were inserted and charged at a ratio of 1/1 (mixing ratio by weight of iron and calcium compound is 2:1) into eight VP75 vinylchloride pipes, 4 meters long, for water arranged serially to perform an experiment under the same conditions as described in Example 6, whereupon the phosphorus concentration of the processed water was 0.015 ppm.

Comparative Example 1

The same measurement as described in Example 7 was carried out with only the disposable body warmers being charged into the same apparatus as in Example 7, whereupon the phosphorus concentration was 0.028 ppm, but the processed water was colored and polluted due to iron ions.

I claim:

1. A dephosphorizing material comprising:
   a) an iron containing material;
   b) a calcium compound material; and
   c) a water permeable material, surrounding at least said iron containing material;
   wherein said water permeable material is capable of bringing a phosphorus containing aqueous solution in contact with said iron containing material and said calcium compound material, said contact being sufficient to cause precipitation of calcium phosphate salts and iron phosphate salts.

2. The dephosphorizing material of claim 1 wherein a mixing ratio by weight of iron component in said iron containing material to said calcium compound material is 0.1 to 50:1 to 100.

3. The dephosphorizing material of claim 1 wherein said water permeable material is formed of a hollow calcium compound material.

4. The dephosphorizing material of claim 1 wherein said calcium compound material is arranged in the water permeable material together with the iron containing material.

5. The dephosphorizing material of claim 1, wherein said calcium compound material is arranged on the outside of said water permeable material.

6. The dephosphorizing material of claim 1, wherein a coefficient of water permeability of said water permeable material is in the range of about $10^{-8}$ to $10^{-2}$ cm sec$^1$.

7. The dephosphorizing material of claim 1, wherein said water permeable material is a cementitious substance, biscuit earthenware, a ceramic, a sintered metal, a high polymer foaming body, a solidified wood powder body, a nonwoven fabric, a woven fabric, or a plastic material.

8. A method of dephosphorization comprising contacting said dephosphorizing material of claim 1 with a phosphorus containing aqueous solution.

9. The method of claim 8, wherein said dephosphorizing material comprises a plurality of members containing an iron containing material, a water permeable material surrounding said iron containing material and a calcium compound material arranged on the outside of said water permeable material, wherein said dephosphorizing material is charged or fixed in a water channel of said phosphorus containing aqueous solution, such that said phosphorus containing aqueous solution flows through said dephosphorizing material.

10. The method of dephosphorization of claim 8 wherein said contact is carried out by soaking said dephosphorizing material into the phosphorus-containing solution.

\* \* \* \* \*